United States Patent
Srivastava et al.

(10) Patent No.: US 12,547,638 B2
(45) Date of Patent: Feb. 10, 2026

(54) TECHNIQUES FOR AUTOMATED QUERY RESPONSE DETERMINATION USING A HYBRID ARTIFICIAL INTELLIGENCE (AI) MODEL

(71) Applicant: OPTUM, INC., Minnetonka, MN (US)

(72) Inventors: Abhishek Srivastava, Pittsburgh, PA (US); Ryan Michael Swan, Santa Monica, CA (US); Somya D. Mohanty, Greensboro, NC (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/665,126

(22) Filed: May 15, 2024

(65) Prior Publication Data

US 2025/0355890 A1    Nov. 20, 2025

(51) Int. Cl.
*G06F 16/00*   (2019.01)
*G06F 16/25*   (2019.01)
*G06F 16/28*   (2019.01)

(52) U.S. Cl.
CPC .......... *G06F 16/254* (2019.01); *G06F 16/285* (2019.01)

(58) Field of Classification Search
CPC .............................. G06F 16/285; G06F 16/254
USPC ......................................................... 707/602
See application file for complete search history.

(56) References Cited

U.S. PATENT DOCUMENTS

| | | |
|---|---|---|
| 10,853,394 B2 | 12/2020 | Kondadadi et al. |
| 2020/0410601 A1 | 12/2020 | Laumeyer et al. |
| 2022/0374479 A1* | 11/2022 | Xiong .................... G06N 5/022 707/707 |
| 2022/0383159 A1 | 12/2022 | Yavuz et al. |
| 2023/0325852 A1 | 10/2023 | Ma et al. |

FOREIGN PATENT DOCUMENTS

CN         117056495 A         11/2023

OTHER PUBLICATIONS

Lenert et al., "Could an artificial intelligence approach to prior authorization be more human?" *Journal of American Medical Informatics Association*, vol. 30 pp. 989-994 (2023).
(Continued)

*Primary Examiner* — Alexandria Y Bromell
(74) *Attorney, Agent, or Firm* — MARSHALL, GERSTEIN & BORUN LLP

(57) ABSTRACT

Techniques for automated query response determination using a hybrid AI are disclosed herein. An example computer-implemented method includes receiving a data file and a request including at least one query associated with the data file and applying a hybrid model to the data file. Applying the hybrid model includes segmenting the data file into one or more portions, embedding the one or more portions into a vector space, extracting, from the data file, data associated with one or more classifications, storing (i) the embedded portions in a first database and (ii) the extracted data in a second database, and determining a response to request queries based on the embedded portions and the extracted data, wherein the hybrid model constrains each response based on a parametric input prompt associated with the extracted data. The example computer-implemented method further includes storing one or more data objects indicating each response.

20 Claims, 4 Drawing Sheets

(56) References Cited

OTHER PUBLICATIONS

Huo et al., "Retrieving Supporting Evidence for Generative Question Answering," (2023).
Nayak, P., "Building an LLM Application for Document Q&A Using Chainlit, Qdrant and Zephyr" (2023).
Choudhury et al., "Using machine learning to minimize delays caused by prior authorization: A brief report." Cogent Engineering, 8.1 (2021).
De Barros et al. "Determining Prior Authorization Approval for Lumbar Stenosis Surgery With Machine Learning." Global Spine Journal (2023).

* cited by examiner

TECHNIQUES FOR AUTOMATED QUERY RESPONSE DETERMINATION USING A HYBRID ARTIFICIAL INTELLIGENCE (AI) MODEL

TECHNICAL FIELD

The present disclosure generally relates to query response techniques, and more particularly, to the use of hybrid artificial intelligence (AI) models to facilitate automated query response determinations.

BACKGROUND

Automated query response systems have applications in numerous industries and provide substantial benefits. Such systems streamline processes by quickly addressing common queries, handling large volumes of such queries simultaneously, and providing instant, round-the-clock support. To further enhance the user experience, many conventional automated query response systems integrate AI and machine learning (ML).

However, these conventional automated query response systems suffer from notable drawbacks. Many conventional systems struggle to comprehend the context of a query beyond simple keyword matching, and therefore often fail to adequately respond to complex queries. Moreover, some conventional systems lack the necessary integration with other critical systems to provide adequate/holistic support, and/or lack the ability to comprehensively adapt in environments where relevant rules or data are frequently changing. Further, conventional systems integrating AI/ML typically suffer from hallucinations, where the system generates incorrect or unrelated answers to the input query.

Therefore, in general, automated query response systems are an area of great interest, and conventional techniques are insufficient for providing accurate query responses. Accordingly, a need exists for techniques that provide users with relevant, accurate query responses.

SUMMARY

In some aspects, a computer-implemented method includes receiving, by one or more processors, a data file and a request including at least one query associated with the data file and applying, by the one or more processors, a hybrid model to the data file. Applying the hybrid model includes segmenting the data file into one or more portions, embedding the one or more portions into a vector space, and extracting, from the data file, data associated with one or more classifications. Applying the hybrid model further includes storing (i) the embedded one or more portions in a first database and (ii) the extracted data in a second database and determining a response to one or more queries in the request based on the embedded one or more portions and the extracted data. The hybrid model constrains each response based on at least one parametric input prompt associated with the extracted data. The computer-implemented method further includes storing, by the one or more processors, one or more data objects indicating each of the responses.

In some aspects, a system includes memory and one or more processors communicatively coupled to the memory. The one or more processors are configured to receive a data file and a request including at least one query associated with the data file and apply a hybrid model to the data file. Applying the hybrid model includes segmenting the data file into one or more portions, embedding the one or more portions into a vector space, and extracting, from the data file, data associated with one or more classifications. Applying the hybrid model further includes storing (i) the embedded one or more portions in a first database and (ii) the extracted data in a second database and determining a response to one or more queries in the request based on the embedded one or more portions and the extracted data. The hybrid model constrains each response based on at least one parametric input prompt associated with the extracted data. The one or more processors are further configured to store one or more data objects indicating each of the responses.

In some aspects, one or more non-transitory computer-readable storage media include instructions that, when executed by one or more processors, cause the one or more processors to receive a data file and a request including at least one query associated with the data file and apply a hybrid model to the data file. Applying the hybrid model includes segmenting the data file into one or more portions, embedding the one or more portions into a vector space, and extracting, from the data file, data associated with one or more classifications. Applying the hybrid model further includes storing (i) the embedded one or more portions in a first database and (ii) the extracted data in a second database and determining a response to one or more queries in the request based on the embedded one or more portions and the extracted data. The hybrid model constrains each response based on at least one parametric input prompt associated with the extracted data. The instructions, when executed, further cause the one or more processors to store one or more data objects indicating each of the responses.

BRIEF DESCRIPTION OF THE DRAWINGS

The Figures described below depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION

Figure 1:
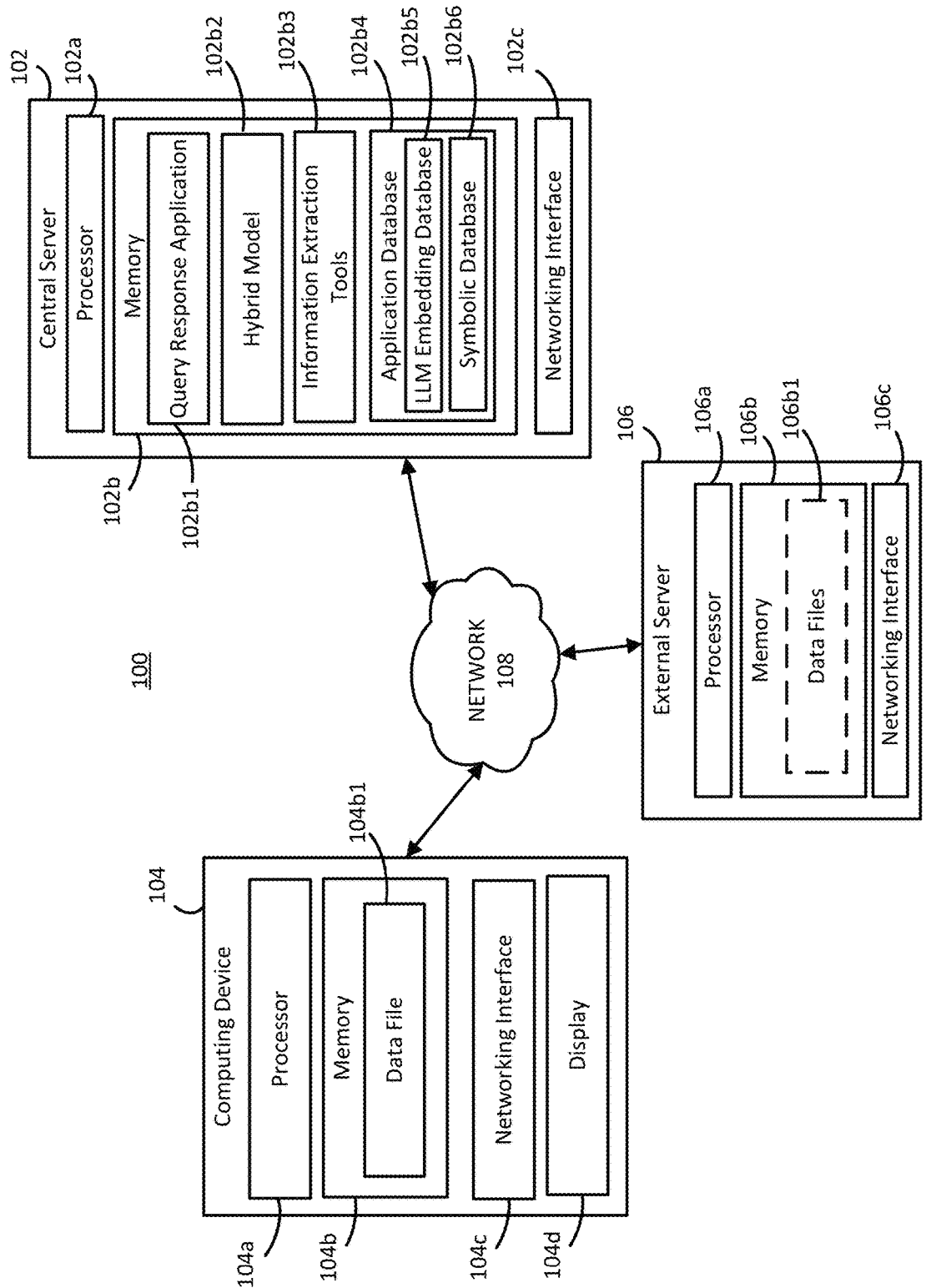
FIG. 1 depicts an example computing system in which various embodiments of the present disclosure may be implemented.

Broadly speaking, the techniques of the present disclosure relate to automated query response determination using a hybrid AI model that leverages multiple AI models and information extraction tools (IETs). The hybrid model is generally configured to determine responses to requests having at least one query associated with a data file by segmenting the data file into one or more portions, embedding the one or more portions into a vector space, and extracting data associated with one or more classification from the data file. The hybrid model then stores the embedded portions in a first database and the extracted data in a second database and determines a response to queries in the request based on the embedded portions and extracted data.

The hybrid model also constrains each response based on parametric input prompts associated with the extracted data. One or more processors of the systems described herein then generate one or more data objects indicating each of the responses.

As mentioned, AI/ML models are applicable in a growing number of use cases, but hallucination and unpredictable responses have limited their real-world adoption in query response systems. The present techniques enforce limits on query response hallucinations by leveraging structured data extracted from data files. Specifically, the present techniques reduce or eliminate hallucinations of a hybrid model utilizing AI/ML models by constraining the AI/ML model outputs in response to a query, using parametric input prompts associated with data extracted directly from data files related to the query. For example, the parametric input prompts can prohibit the hybrid model from including information/data in a response if that information/data is not included in, indicated in, or otherwise supported by the original data file, thereby reducing or eliminating hallucinations and correspondingly increasing the accuracy of all model outputs.

The extracted data used to formulate the parametric input prompts is associated with classifications of data represented in the data file related to the query. As an example, the data file may be a patient chart, and these classifications may be patient demographics, medical codes, patient vitals data, laboratory results, clinical indicators, and/or other medical values within the patient chart. The extracted data associated with each of these classifications thus represents actual patient medical data and can therefore function as ground truth data for responding to factual queries about the patient chart. Thus, constraining responses output by the hybrid model based on parametric input prompts associated with the extracted data can reduce or eliminate hallucinations. The resulting data objects indicating these responses that are stored by the systems described herein also have correspondingly fewer inaccuracies because each response has a significantly lower likelihood of including hallucinated and/or otherwise erroneous data. These improvements are particularly significant in fields (e.g., prior authorization in the medical claims field) where such hallucinations hamstring approval processes and deter adoption of AI/ML-based systems altogether.

The techniques of the present disclosure also improve the functionality of a computing device (e.g., a hosting server such as a central server) at least by using a hybrid model in a particular way to enhance the intelligence or predictive ability of the computing device. This hybrid model, executing on the computing device, can more accurately respond to requests than when using conventional techniques. That is, the present disclosure describes improvements in the functioning of the computer itself because the computing device can more accurately determine responses to input queries. This improves over the prior art at least because existing models determining such responses.

Moreover, the present disclosure includes effecting a transformation or reduction of a particular article to a different state or thing, e.g., reducing/eliminating the inaccuracies of a computing system (and associated subsystems/components/devices) from a non-optimal or error state (e.g., prone to hallucinations) to an optimal (or closer to optimal) state by constraining hybrid model responses to a query using parametric input prompts that are associated with data extracted from data file(s) related to the query.

Still further, the present disclosure includes specific features other than what is well-understood, routine, conventional activity in the field, or adding unconventional steps that demonstrate, in various embodiments, particular useful applications, e.g., segmenting a data file into one or more portions; embedding the one or more portions into a vector space; extracting, from the data file, data associated with one or more classifications; storing (i) the embedded one or more portions in a first database and (ii) the extracted data in a second database; and/or determining a response to one or more queries in the request based on the embedded one or more portions and the extracted data, wherein the hybrid model constrains each response based on at least one parametric input prompt associated with the extracted data, among others.

Of course, it should be appreciated that the advantages and technical improvements described above and elsewhere herein are not the only advantages and/or technical improvements that may be realized as a result of the techniques described herein. Other advantages and/or technical improvements to the functioning of a computer itself or other technologies or technical fields may be apparent to one of ordinary skill in the art. Moreover, while described herein primarily in the medical context, the techniques described herein may be readily applied in any suitable field for any suitable purpose.

Example Computing System

FIG. 1 depicts an example computing system 100 in which various embodiments of the present disclosure may be implemented. Depending on the embodiment, the example computing system 100 may determine query responses, and/or any related values or combinations thereof. Of course, it should be appreciated that, while the various components of the example computing system 100 (e.g., central server 102, computing device 104, external server 106, etc.) are illustrated in FIG. 1 as single components, the example computing system 100 may include multiple (e.g., dozens, hundreds, thousands) of computing devices 104 and external servers 106 that are simultaneously connected to the network 108 at any given time.

Generally, the example computing system 100 includes a central server 102, a computing device 104, and an external server 106. The central server 102 includes one or more processors 102a, a memory 102b, and a networking interface 102c. The computing device 104 includes one or more processors 104a, a memory 104b, a networking interface 104c, and a display 104d. The external server 106 includes one or more processors 106a, a memory 106b, and a networking interface 106c. The central server 102, the computing device 104, and the external server 106 generally communicate data across the network 108 to determine query responses based on input data files. For example, the central server 102 may be a server associated with a healthcare insurer, and the computing device 104 and/or the external server 06 may be associated with a healthcare service provider or a patient/insured entity.

The central server 102 receives data file 104b1 from the computing device 104 connected to the server 102 through a network 108 and processes the data file 104b1 in accordance with one or more sets of instructions stored in a memory 102b to output any of the values described herein. The central server 102 may execute the query response application 102b1, which in turn, may access and apply the hybrid model 102b2, the information extraction tools 102b3, and/or the application database 102b4 to the data file 104b1. The data file 104b1 generally includes a plurality of data. In certain embodiments, the data included in the data file 104b1 is or includes a text string, an audio file, a video file, a uniform resource locator (URL) to a web location, and/or any other suitable data/datatype(s) or combinations thereof.

Accordingly, in these embodiments, the data file 104b1 is or includes a plurality of such text strings, audio files, video files, URLs, and/or any other suitable data/datatype(s) or combinations thereof.

The computing device 104 is or includes any device that is associated with (e.g., owned and/or operated by) a particular entity that may provide data (e.g., data file 104b1) that is transmitted to and/or is otherwise accessible by the central server 102 and/or the external server 106 through the network 108. In certain embodiments, the data file 104b1 transmitted to and/or otherwise accessible by the central server 102 and/or the external server 106 is a patient chart that includes medical data/values to be evaluated by the central server 102 and/or the external server 106. In some embodiments, the computing device 104 is a server or collection of servers hosting the data file 104b1. However, in certain embodiments, the computing device 104 is a personal computing device of that entity, such as a smartphone, a tablet, smart glasses, or any other suitable device or combination of devices (e.g., a smart watch plus a smartphone) with wireless communication capability. In the embodiment of FIG. 1, the memory 104b stores the data file 104b1.

The computing device 104 is communicatively coupled to the central server 102 and/or the external server 106. For example, the computing device 104, the central server 102, and/or the external server 106 may communicate via USB, Bluetooth, Wi-Fi Direct, Near Field Communication (NFC), etc. For example, the central server 102 may transmit a determined response, data object(s), and/or any other values, responses, or combinations thereof to the computing device 104 via the networking interface 102c, which the computing device 104 may receive via the networking interface 104c.

The external server 106 may be or include computing servers and/or combinations of multiple servers storing data that may be accessed/retrieved by the central server 102 and/or the computing device 104. In certain embodiments, the external server 106 receives data from the central server 102 and/or the computing device 104 and retrieves/accesses information stored in memory 106b for transmission back to the central server 102 and/or the computing device 104. It should be appreciated that the external server 106 can include one or multiple computing devices that are co-located or distributed.

Further, in certain embodiments, the external server 106 includes a data file 106b1 including data from one or both of the computing device 104 and/or the central server 102. In one such example, the external server 106 is a server located in and/or otherwise associated with a hospital or other healthcare provider, and the data file 106b1 includes an electronic health record in memory 106b. As another example, the external server 106 serves as a database for some/all of the application database 102b4. In some embodiments, the example computing system 100 does not include the external server 106.

Returning to the central server 102, the memory 102b stores executable instructions that are configured to, when executed by the one or more processors 102a, cause the one or more processors 102a to analyze data received at the central server 102 and output various values. The query response application 102b1, the hybrid model 102b2, the information extraction tools 102b3, and the application database 102b4 may all include such executable instructions, as well as other data. The memory 102b may also store additional data and/or databases. It should be appreciated that the central server 102 can include one or multiple computing devices that are co-located or distributed.

Generally, the query response application 102b1 receives the data file(s) 104b1 from the computing device 104 and/or the external server 106 along with a request. The request includes at least one query associated with the data file 104b1. For example, the data file 104b1 may be a patient chart of a patient, and a first query included as part of a request may state "Has the patient tried pain medication to relieve pain?" and a second query included as part of the request may state "What are the medical procedures performed on the patient?" The query response application 102b1 determines responses to each query included in the request based on data included in the data file 104b1 (e.g., patient chart).

More specifically, the query response application 102b1 executes/applies a hybrid model 102b2 to determine a response to one or more queries in the request. In certain embodiments, the application 102b1 executes the hybrid model 102b2 to determine a response to each query included in the request. In some embodiments, the hybrid model 102b2 is generally a combination of a large language model (LLM) and a symbolic artificial intelligence (S-AI) model. Accordingly, the hybrid model 102b2 includes AI algorithms/models that utilize ML techniques to perform query response determination. In some embodiments, the hybrid model 102b2 includes and/or utilizes any other suitable ML technique(s), including supervised and/or unsupervised ML techniques.

In any event, the query response application 102b1 applying the hybrid model 102b2 segments the data file 104b1 into one or more portions. This includes extracting attributes from the data file 104b1 and segmenting the data file 104b1 based on segmentation windows that each include one of the one or more portions. In certain embodiments, an LLM of the hybrid model 102b2 segments the data file 104b1. The segmentation windows generally include a small overlap with adjacent windows to maintain the overall context of the portions within the data file 104b1. The attributes may include metadata, such as a document/file type, page numbers, chart relevance, and the query response application 102b1 associates each of these attributes with the corresponding portions when stored in memory 102b (e.g., in application database 102b4). For example, in certain embodiments, the application 102b1 may store the attributes in a first database (e.g., LLM embedding database 102b5) in the application database 102b4 with the portions of the data file 104b1.

The query response application 102b1 also applies the hybrid model 102b2 to embed the one or more portions of the data file 104b1 into a vector space. In certain embodiments, an LLM of the hybrid model 102b2 embeds the portions of the data file 104b1. Each of the portions include text data, and the hybrid model 102b2 determines high-dimensional vector representations of this text data that constitute the embeddings of each portion. The query response application 102b1 then stores these embeddings in a database (e.g., LLM embedding database 102b5) for subsequent access to determine responses to the queries included in the request.

Further, the query response application 1202b1 applies the hybrid model 102b2 to extract data associated with one or more classifications from the data file 104b1. The extracted data generally includes one or more data points that each correspond to a classification. When the query response application 102b1 extracts the data associated with one or more classifications from the data file 104b1, the application 102b1 stores the extracted data in a database (e.g., symbolic database 102b6) for subsequent access to determine responses to the queries included in the request. In certain embodiments, an S-AI of the hybrid model 102*b*2 extracts the data from the data file 104*b*1. This data generally corresponds to raw text data within the data file 104*b*1 that the hybrid model 102*b*2 determines is associated with one or more classifications. These classifications are typically predetermined and may broadly represent data types that are likely to be included in queries related to the data file.

For example, classifications associated with a patient chart may include patient demographics, patient attributes, service codes, patient vitals, laboratory results, clinical indicators, and/or other suitable medical classifications or combinations thereof. The hybrid model 102*b*2 extracts the data associated with one or more of these classifications and stores the extracted data in a database (e.g., a second database of the application database 102*b*4). In certain embodiments, the query response application 102*b*1 stores, for each data point of the extracted data, a phrase definition in the application database 102*b*4. Each phrase definition indicates a classification of the one or more classifications associated with the data point. As an example, a phrase definition may indicate that a data point extracted from a patient chart is a lipid panel result for the corresponding patient that is associated with the laboratory results classification.

The query response application 102*b*1 stores both the embedded data and the extracted data in the application database 102*b*4, and may store the data in separate databases within the application database 102*b*4. For example, the query response application 102*b*1 may store the embedded data in an LLM embedding database 102*b*5 of the application database 102*b*4 that is a specialized database designed to store and manage high-dimensional vector representations (i.e., embeddings) of complex data along with the metadata to capture contextual and semantic information of the embedded data. The application 102*b*1 generally leverages the LLM embedding database 102*b*5 to store large unstructured information (e.g., large patient chart text) separated into semantic chunks. Similarly, the query response application 102*b*1 may store the extracted data in a symbolic database 102*b*6 of the application database 102*b*4, where the extracted data is stored in a converted text form, as extracted from the output of the S-AI model.

More generally, the application database 102*b*4 includes data from the received data file 104*b*1 and data generated/output by the query response application 102*b*1 as a result of executing, for example, the hybrid model 102*b*2 and/or the information extraction tools 102*b*3. As illustrated in FIG. 1, the application database 102*b*4 includes the LLM embedding database 102*b*5 that stores segmented portions of received data files that are embedded into vector spaces by the hybrid model 102*b*2, and the symbolic database 102*b*6 that stores data extracted from the received data files by the hybrid model 102*b*2.

Regardless, with the embedded data portions and the extracted data from the data file 104*b*1, the query response application 102*b*1 then applies the hybrid model 102*b*2 to determine a response to one or more queries included in the received request. Broadly, the application 102*b*1 applies the hybrid model 102*b*2 to determine the responses by evaluating the query and utilizing data from the embedded data portions and the extracted data to formulate a response that reflects information included in the data file 104*b*1. Importantly, the hybrid model 102*b*2 reduces, or avoids entirely, the hallucination issues experienced by conventional techniques by leveraging the extracted data as parametric input prompts.

More specifically, the hybrid model 102*b*2 constrains each response based on at least one parametric input prompt associated with the extracted data. The parametric input prompts generally include prompted constraints from the extracted data configured to prevent the hybrid model 102*b*2 from determining a response to a query that does not accurately represent data/information included in the data file 104*b*1. For example, a query may state "What medications has the patient taken that contain compound X?", the extracted data may indicate that the patient has reported taking drugs A-F, and it may be true that C and D contain compound X. In this example, a parametric input prompt used to constrain the response determined by the hybrid model 102*b*2 may state "Drugs reported taken by patient: A-F," which will prevent the hybrid model 102*b*2 from hallucinating a response erroneously indicating that the patient has reported taking e.g., drug K that contains compound X, because drug K is not indicated in the parametric input prompt. The hybrid model 102*b*2 may then analyze the drugs indicated in the parametric input prompt to determine that drugs C and D contain compound X, and may determine a response accordingly, as described herein. Thus, the hybrid model 102*b*2 will be constrained to determine a response that can only include the drugs indicated in the extracted data from the data file (e.g., drugs A-F), which substantially reduces the possible hallucinations the hybrid model 102*b*2 may make when determining a response.

In certain embodiments, determining a response to each query includes deconstructing the queries into sub-queries. The hybrid model 102*b*2 utilizes a prompt-based instruction and a curated example to deconstruct the initial query into sub-queries, which enables the hybrid model 102*b*2 to perform multi-hop reasoning or question answering. Specifically, the query response application 102*b*1 may apply the hybrid model 102*b*2 to determine, by a question-answering LLM (QA-LLM) of the hybrid model 102*b*2, one or more sub-queries corresponding to each query based on a prompt-based instruction and a curated example. Further, the application 102*b*1 may apply the hybrid model 102*b*2 to sequentially answer each of the one or more sub-queries to determine the response to each query.

For example, the hybrid model 102*b*2 may deconstruct the initial query "Has patient tried pain medication to relieve pain?" into a series of sub-queries to ultimately answer the initial query. These sub-queries may include: (1) "What are the medications mentioned in the patient chart?", (2) "Which of these medications are pain related?", and (3) "Has the patient tried the mentioned pain related medications?" The query response application 102*b*1 thereby follows a sequential pathway by applying the QA-LLM to deconstruct each query and answer each sub-query. In particular, the QA-LLM answers each sub-query individually, and the output of an individual sub-query is used as input (along with additional context) to the next sub-query. To answer each sub-query, the query response application 102*b*1 searches (e.g., via application of the hybrid model 102*b*2) the application database 102*b*4 to access/retrieve relevant embedded portions and extracted data of the data file 104*b*1.

When the query response application 102*b*1 has deconstructed the query into sub-queries and/or is otherwise ready to search the application database 102*b*4, the application 102*b*1 determines an information extraction tool (IET) 102*b*3 that is optimally suited to search the database 102*b*4. The chosen/determined IET then searches the application database 102*b*4 to retrieve the embedded portions and the extracted data and structures the response to each query/ sub-query based on the searching. Generally, each IET 102b3 is configured to search the application database 102b4 for different classifications/types of data needed to answer a query/sub-query. For example, if the data file 104b1 is a patient medical chart, the IETs 102b3 may include a codes tool configured to retrieve data related to medical codes and terminology, a labs tool configured to retrieve data related to laboratory results/charts, a vitals tool configured to retrieve data related to vital signs, a procedures tool configured to retrieve data related to procedures mentioned in the patient chart, a demographic tool configured to retrieve data related to the demographic information of the patient, and/or other tools or combinations thereof.

Each IET 102b3 has a corresponding description which the query response application 102b1 uses to select the specific IET 102b3 to retrieve data from the database 102b4 sufficient/necessary to answer the queries/sub-queries. Namely, the query response application 102b1 matches embeddings of the query/sub-query to the IET descriptions to identify the specific IET that is optimally configured to retrieve the sufficient/necessary data to answer the query/sub-query. In certain embodiments, the query response application 102b1 determines a vector match similarity value between embeddings of each query/sub-query and the corresponding description of each IET 102b3. In these embodiments, the application 102b1 further determines the IET 102b3 for a respective query/sub-query based on a respective IET 102b3 with a highest vector match similarity value. In certain embodiments, the vector match similarity value may be a cosine similarity value.

Each IET 102b3 uses an LLM of the hybrid model 102b2 to query/search and curate the data from the application database 102b4. For example, the IETs 102b3 may use few-shot prompting in the LLM(s) to answer the specific queries/sub-queries based on the data in the database 102b4 and structure the output for further use. As an example, the data file 104b1 is a patient chart and the query response application 102b1 may select a drugs/medication IET to answer the question "What are the medications mentioned in the patient chart?" In certain embodiments, each IET 102b3 utilizes an LLM trained to search the application database 102b4 and to structure the answer to the query/sub-query.

In some embodiments, after the IET(s) 102b3 return data from the application database 102b4, the query response application 102b1 verifies, by a fusion LLM (F-LLM) of the hybrid model 102b2, the response from the IET(s) 102b3 based on a prompt-based weighting instruction. The F-LLM is trained to resolve conflicts between (1) the information indicated by the embedded portions (stored in, e.g., the LLM embedding database 102b5), and (2) the extracted data stored the symbolic database 102b6, by utilizing few-shot prompting. The prompt-based weighting instruction generally enables the F-LLM to evaluate the data retrieved from the application database 102b4 by the IET(s) 102b3 and answer the posed query/sub-query. The few-shot prompting allows the F-LLM to address multiple scenarios that may indicate reliability issues with data retrieved from the application database 102b4. For example, scenarios in which applicable data is only available from the LLM embedding database 102b5 or the symbolic database 102b6, scenarios in which the data retrieved from the databases 102b5, 102b6 contradict each other, and/or other scenarios or combinations thereof. In certain embodiments, the F-LLM may perform these verification actions over multiple steps, and at each step, the F-LLM may record intermediate outputs in the application database 102b4 for future logging and/or auditing related to the determined responses output by the hybrid model 102b2.

After the query response application 102b1 applies the F-LLM of the hybrid model 102b2, the query response application 102b1 applies the hybrid model 102b2 to structure the response with an answer to the query/sub-query. The application 102b1 then generates and stores a data object indicating the response. Each data object generally includes the text and/or other data (e.g., video, audio, etc.) associated with a response, and the information represented by the data objects can be displayed to a user for review. A data object may include the response and supporting evidentiary data for a single query/sub-query, or the data object may be a listing of answers to each query/sub-query that was answered as part of the query response application 102b1 processing the request. In certain embodiments, the query response application 102b1 structures the data object to include a binary output (e.g., yes/no answer to the query/sub-query) and supporting evidence from the LLM embedding database 102b5 and the symbolic database 102b6 for each response.

As noted above, the hybrid model 102b2 is generally configured to utilize artificial intelligence and/or machine learning techniques. These artificial intelligence and/or machine learning techniques can include supervised machine learning techniques, for example. Machine learning may be implemented through machine learning methods and algorithms. In certain embodiments, the hybrid model 102b2 includes/utilizes a S-AI model and multiple LLMs to perform the various query response determination actions described herein.

In certain embodiments, the hybrid model 102b2 is trained (e.g., by query response application 102b1, by another application of central server 102, or by another device or system) using supervised learning, which generally involves identifying patterns in existing data to make predictions about subsequently received data. Specifically, the hybrid model 102b2 (e.g., the LLMs) may be "trained" using training data, which includes example inputs and associated example outputs. Based upon the training data, the hybrid model 102b2 generates a predictive function which maps outputs to inputs and utilizes the predictive function to generate machine learning outputs based upon data inputs. The exemplary inputs and exemplary outputs of the training data may include any of the data inputs or machine learning outputs described herein. In the exemplary embodiment, a processing element may be trained by providing it with a large sample of data with known characteristics or features.

For example, the LLMs of the hybrid model 102b2 are a type of artificial intelligence, specifically deep learning models, designed to understand and generate human-like text by processing vast amounts of data. These models are built using neural networks and trained on extensive corpora of text to learn the complex patterns and structures present in natural language. LLMs can perform a wide range of tasks, including question-answering, text summarization, translation, and more. To illustrate, in instances where the data file 104b1 is a patient chart, LLMs can process and analyze the patient chart data to identify relevant medical information and relationships by leveraging the vast training knowledge of language and context, particularly as applied to patient charts.

It is to be understood that supervised machine learning may also comprise retraining, relearning, or otherwise updating models with new, or different, information, which may include information received, ingested, generated, or otherwise used over time. Further, it should be appreciated that, as previously mentioned, the application 102b1 uses the hybrid model 102b2 to output a response determination, and/or any other values, responses, or combinations thereof using artificial intelligence (e.g., a machine learning model of the hybrid model 102b2) or, in alternative aspects, without using artificial intelligence. Additionally, other portions of the hybrid model 102b2 may utilize artificial intelligence without leveraging machine learning.

For example, the S-AI model of the hybrid model 102b2 relies on symbolic manipulation and rule-based processing to extract data from received data files 104b1. More specifically, the S-AI model leverages vector comparisons to identify relationships between various data points and uses a pre-defined knowledge base to interpret and associate the data. To illustrate, the S-AI model may analyze a patient chart to identify relationships between codes, terminologies, labs, vitals, and/or markers through vector comparisons of the vector-based representations of such data points. The S-AI model can further enhance the pre-defined knowledge base, and thereby increase the resulting efficiency and accuracy of the identified data point relationships by incorporating external information, such as the latest medical research and guidelines.

Moreover, although some of the methods or techniques described elsewhere herein may not directly mention machine learning techniques, such methods or techniques may be read to include such machine learning for any determination or processing of data that may be accomplished using such techniques. Such machine learning models/algorithms may, therefore, be used to perform part or all of the analytical functions of the methods or techniques described elsewhere herein. In some aspects, such machine learning techniques is implemented automatically upon occurrence of certain events or upon certain conditions being met. In any event, use of machine learning techniques, as described herein, may begin with training a machine learning program, or such techniques may begin with a previously trained machine learning program.

Further, in one embodiment, one computing system/entity (e.g., central server 102) can both train and use a machine learning model (e.g., hybrid model 102b2). In certain embodiments, separate, dedicated systems/entities can train a machine learning model or use the machine learning model but cannot train and use the machine learning model. In these embodiments, the separate, dedicated systems/entities can coordinate with each other if desired. For example, the external server 106 or the computing device 104 may train the hybrid model 102b2, transmit the trained hybrid model 102b2 to the central server 102, and the central server 102 may execute the query response application 102b1 to use/apply the hybrid model 102b2.

Each of the processors 102a, 104a, 106a may include any suitable number of processors and/or processor types. For example, the processors 102a, 104a, 106a may each include one or more CPUs and one or more graphics processing units (GPUs). Generally, each of the processors 102a, 104a, 106a may be configured to execute software instructions stored in each of the corresponding memories 102b, 104b, 106b. The memories 102b, 104b, 106b may each include one or more persistent memories (e.g., a hard drive and/or solid state memory) and may store one or more applications, modules, and/or models, such as the query response application 102b1.

The networking interface 102c may enable the central server 102 to communicate with the computing device 104, the external server 106, and/or any other suitable devices or combinations thereof. More specifically, the networking interface 102c enables the central server 102 to communicate with each component of the example computing system 100 across the network 108 through their respective networking interfaces 104c, 106c. The networking interfaces 102c, 104c, 106c may support wired or wireless communications, such as USB, Bluetooth, Wi-Fi Direct, Near Field Communication (NFC), etc. The networking interface 102c may enable the central server 102 to communicate with the various components of the example computing system 100 via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc.

Moreover, the network 108 may be a single communication network, or may include multiple communication networks of one or more types (e.g., one or more wired and/or PANs or LANs, and/or one or more WANs such as the Internet). In some embodiments, the network 108 includes multiple, entirely distinct networks (e.g., one or more networks for communications between central server 102 and computing device 104, and a separate, Bluetooth or wireless LAN (WLAN) network for communications between central server 102 and computing device 104, and so on).

It will be understood that the above disclosure is one example and does not necessarily describe every possible embodiment. As such, it will be further understood that alternate embodiments may include fewer, alternate, and/or additional steps or elements.

Example Query Response Determination Architecture and Sequences

Figure 2A:
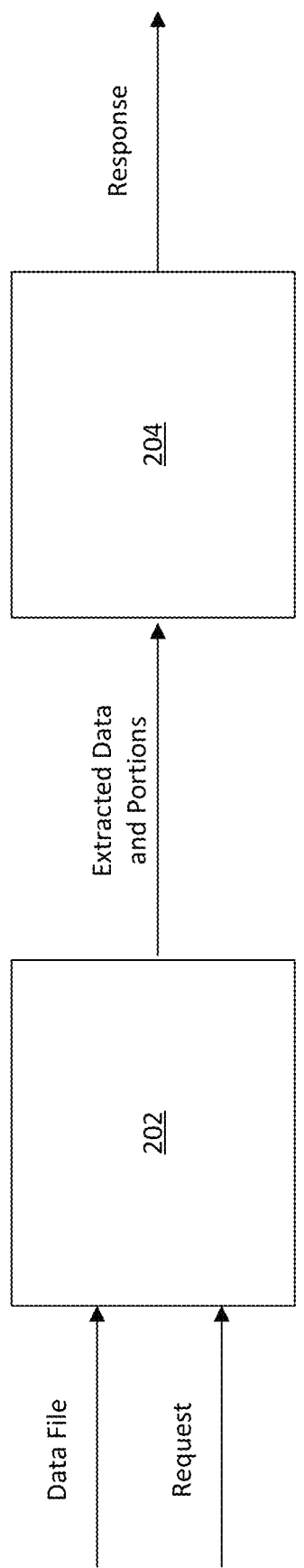
FIG. 2A depicts an example response determination sequence, in accordance with various embodiments described herein.

FIG. 2A depicts an example response determination sequence 200, in accordance with various embodiments described herein. The example response determination sequence 200 broadly illustrates a data extraction and portioning stage 202 and a response determination stage 204, which may be performed by central server 102 (e.g., processor 102a and/or other components of central server 102) of FIG. 1, for example. The example response determination sequence 200 illustrated in FIG. 2A is for the purposes of discussion only, and additional/alternative response determination sequences utilizing additional/alternative AI/ML techniques may also, or instead, be utilized.

Initially, the data extraction and portioning stage 202 includes receiving a data file and a request. The data file is then segmented into one or more portions that are subsequently embedded into a vector space and stored in an embedding database (e.g., LLM embedding database 102b5). The data file is also analyzed to extract data from the data file that is associated with one or more classifications, which is stored in another database (e.g., symbolic database 102b6). In certain embodiments, the one or more portions of the data file and the extracted data from the data file are not stored in separate databases and are stored in a single location within the application database 102b4.

As mentioned, the segmenting, embedding, and extracting are generally performed by applying a hybrid model (e.g., hybrid model 102b2) to the data file. The hybrid model includes an LLM and a S-AI model, and these models are applied at the data extraction and portioning stage 202 to segment, embed, and extract data related to the data file. The LLM is generally applied to segment the data file into the one or more portions and to embed the segmented data into a vector space. The S-AI model is generally applied to extract data from the data file that is associated with the one or more classifications. In certain embodiments, the LLM and/or the S-AI model applied to the data file includes multiple LLMs or S-AI models configured to perform the functions of the data extraction and portioning stage 202.

The output of the data extraction and portioning stage 202 is the extracted data and the embedded data portions. Of course, this data may be output by storing the data into the databases (e.g., LLM embedding database 102b5 and symbolic database 102b6) described herein. Regardless, the response determination stage 204 access/retrieves and utilizes this data to determine responses. The response determination stage 204 generally includes determining a response to the queries included in the request. In certain embodiments, the response determination stage 204 includes determining a response to each query/sub-query included and/or otherwise determined from the request.

More specifically, the response determination stage 204 includes determining a response to one or more queries in the request based on the embedded portions and the extracted data output at the data extraction and portioning stage 202. As part of the response determination stage 204, the hybrid model constrains each response based on at least one parametric input prompt associated with the extracted data. As previously discussed, the parametric input prompts generally cause the hybrid model to constrain responses by only including data that is included in, indicated in, or otherwise supported by the input data file. In this manner, the parametric input prompts prevent the hybrid model from hallucinating data in responses by eliminating the potential for the hybrid model to incorporate data that is not explicitly included in the data file into a response.

In certain embodiments, the response determination stage 204 further includes generating and/or storing one or more data objects indicating each of the responses. The data objects generally include text and/or other data (e.g., video, audio, etc.) associated with a response and may include supporting evidentiary data for each single query/sub-query of the response. The response determination stage 204 thus may include generating data objects by collecting the responses to each query/sub-query answered in response to analyzing the request, as well as collecting the supporting evidentiary data from the relevant database(s) (e.g., application database 102b4). The response determination stage 204 may then include formatting the data objects to provide a query/sub-query, response, and supporting evidentiary data in sequence for each query/sub-query answered in response to analyzing the request. For example, a simplified data object may indicate a query "What pain medications has the patient taken?", with a response "Patient has taken medications X, Y, and Z", and supporting evidentiary data "Taken from patient chart, page 4, second B".

In certain embodiments, the response determination stage 204 includes structuring the data object to include a binary output (e.g., yes/no answer to the query/sub-query) and supporting evidence from the LLM embedding database 102b5 and the symbolic database 102b6 for each response. For example, the query may be "Has the patient tried cortisone injections?", to which the response may be "No", and the response determination stage 204 may further include, as part of the response, supporting evidentiary data stating "Patient chart at page 6 does not list cortisone injections as a 'prescribed treatment'". Of course, not every query/sub-query analyzed at the response determination stage 204 may be answerable in a binary manner, and thus the response determination stage 204 may include structuring the data object to include any suitable response with any suitable supporting evidentiary data from the application database.

Moreover, in certain instances, the response determination stage 204 may include structuring the data object without supporting evidentiary data. In these instances, the data object stored in the application database does not include supporting evidentiary data from the data file to verify the response for one or more of the queries/sub-queries answered within of the data object.

Additionally, or alternatively, the supporting evidentiary data provided as part of the structured data object may include a reference link to the data file, and more specifically, to a portion of the data file where the supporting evidentiary data corresponding to the response of a query/sub-query is located. Thus, when a user reviews the information represented by the data object to analyze the responses, the user may interact with the reference link, and the query response application (e.g., query response application 102b1) may open the data file to the location specified by the reference link to enable the user to quickly verify the response.

Figure 2B:
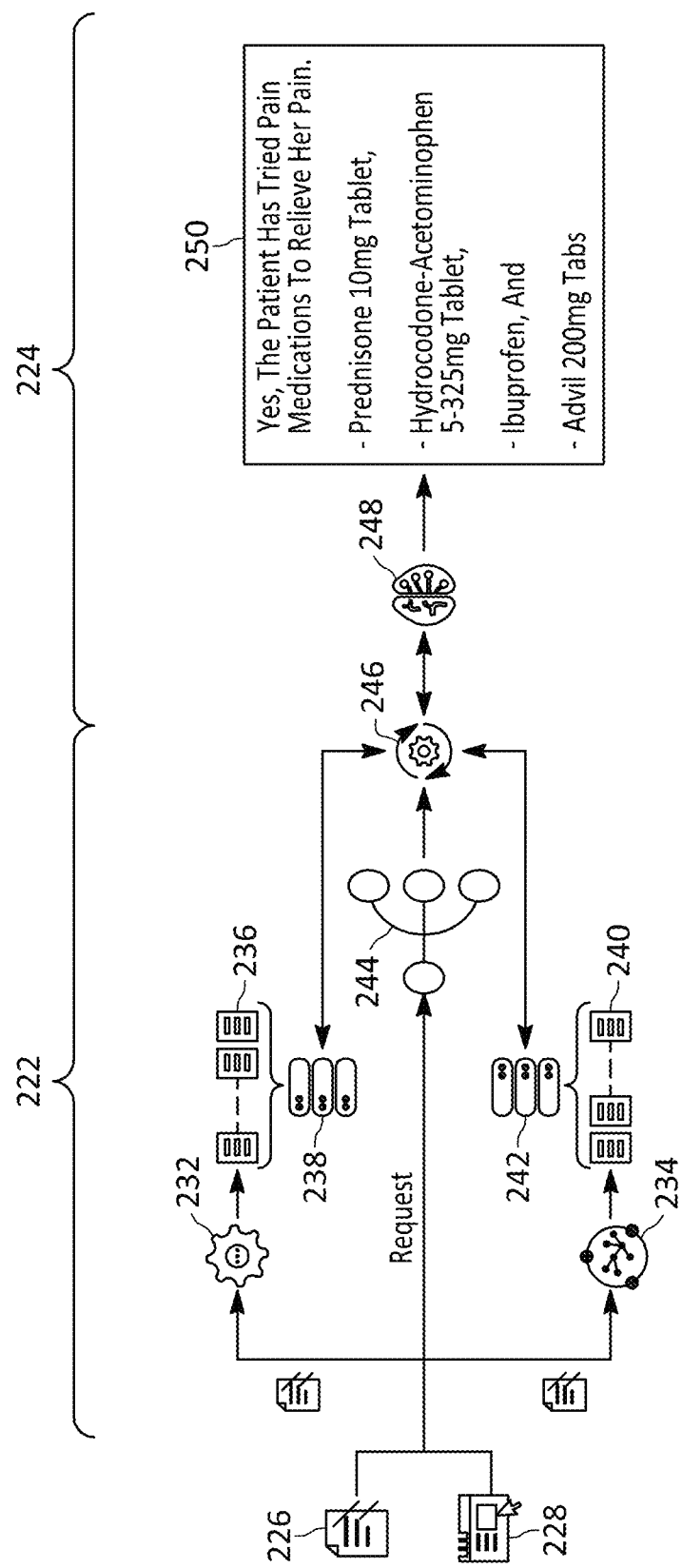
FIG. 2B depicts an example detailed response determination architecture, in accordance with various embodiments described herein.

FIG. 2B depicts an example detailed response determination architecture 220, in accordance with various embodiments described herein. In certain embodiments, the central server 102 and components included therein may implement some/all of the example detailed response determination architecture 220. Generally, the example architecture 220 includes a data extraction phase 222 and a data fusion phase 224. The data extraction phase 222 includes the query response application described herein (e.g., application 102b1) applying a hybrid model (e.g., hybrid model 102b2) to an input data file 226 and a request 228. The data fusion phase 224 includes the query response application merging the data from the data extraction phase 222 into a response related to the request 228.

The data extraction phase 222 generally includes feeding the data file 226 into an LLM 232 and a S-AI 234 that are configured to segment/extract data from the data file 226. The LLM 232 segments the data file 226 into one or more portions 236 that the LLM 232 embeds into a vector space and stores in an LLM embedding database 238. The S-AI 234 extracts data from the data file 226 that is related to one or more classifications and stores the extracted data 240 in a symbolic database 242.

As part of the data extraction phase 222, the request 228 is routed by a routing tool 244 to an IET 246 that is configured to access/retrieve data associated with the request 228. The routing tool 244 may also utilize a QA-LLM to deconstruct the request 228 into a set of queries/sub-queries that the IET 246 uses to retrieve relevant data from the databases 238, 242. With the queries/sub-queries, the IET 246 searches/queries the LLM embedding database 238 and the symbolic database 242 to retrieve data from the data file that is sufficient/necessary to answer the queries/sub-queries included and/or determined based on the request 228.

The IET 246 returns the retrieved data to an F-LLM 248 in the data fusion phase 224. The F-LLM 248 merges the retrieved embedded data from the LLM embedding database 238 with the extracted data from the symbolic database 242 to determine responses to the queries/sub-queries of the request 228. The F-LLM 248 can also generate a data object 250, which in the illustrated example of FIG. 2B, includes a response to a single query. Namely, an example request 228 poses the query "Has the patient tried pain medications to relieve pain?", and the data object 250 indicates the response to the query by stating "Yes, the patient has tried pain medications to relive her pain" and lists several pain medications the patient has taken that are explicitly mentioned in the data file 226. Of course, other data objects may include responses to multiple queries/sub-queries. Further, the F-LLM 248 may not generate the data object 250, and instead the query response application (e.g., query response application 102*b*1) may access separate instructions configured to generate/store the data object 250 based on the responses output by the F-LLM 248.

Example Computer-Implemented Methods

Figure 3:
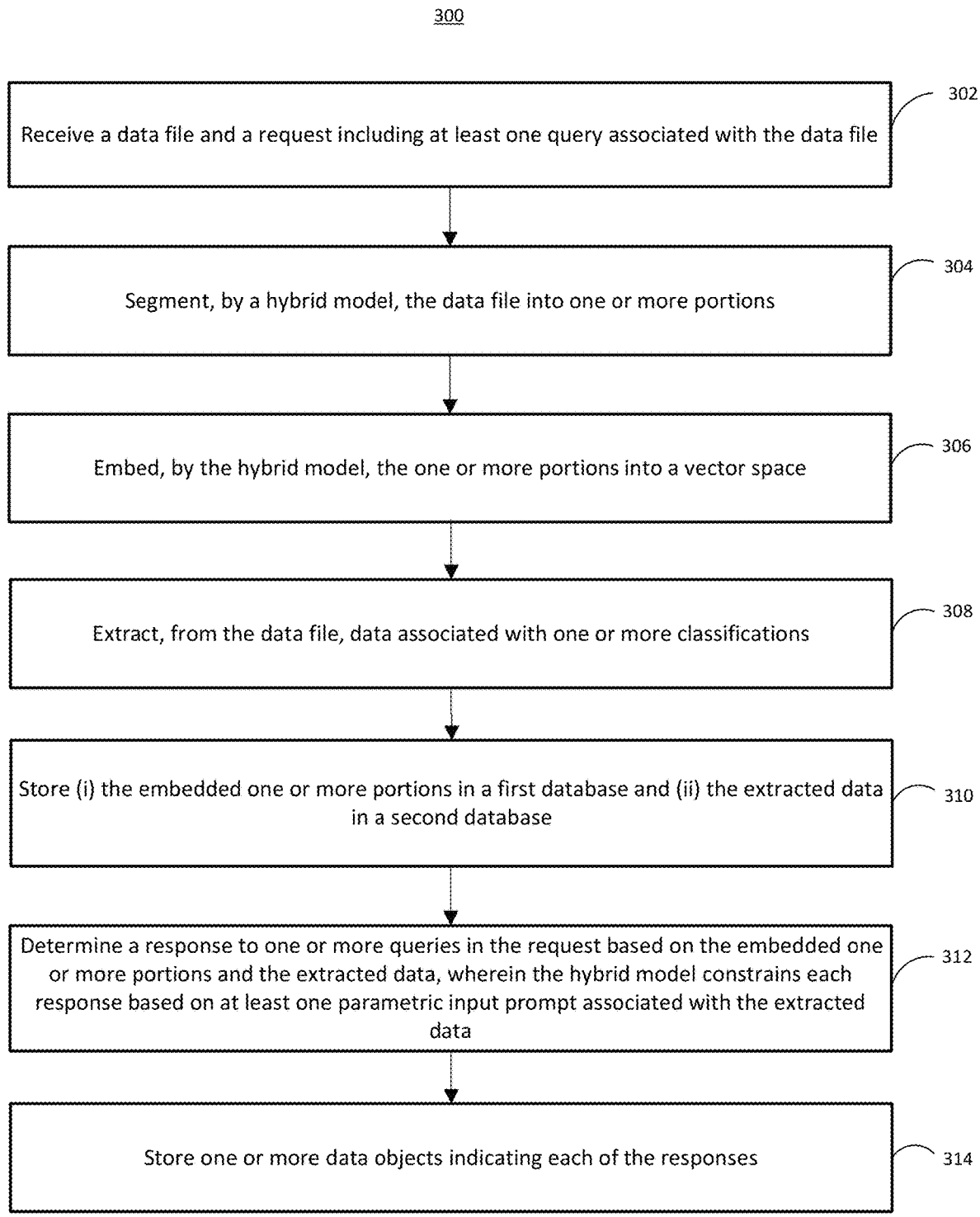
FIG. 3 depicts a flow diagram representing an example computer-implemented method, in accordance with various embodiments described herein.

FIG. 3 depicts a flow diagram representing an example computer-implemented method 300, in accordance with various embodiments described herein. The method 300 may be implemented by one or more processors of the example computing system 100, such as the processor 102*a* of central server 102, for example.

The method 300 includes receiving a data file and a request including at least one query associated with the data file (block 302). The method 300 further includes applying a hybrid model to the data file by segmenting the data file into one or more portions (block 304). The method 300 further includes applying the hybrid model by embedding the one or more portions into a vector space (block 306). The method 300 further includes applying the hybrid model by extracting, from the data file, data associated with one or more classifications (block 308).

The method 300 further includes applying the hybrid model by storing (i) the embedded one or more portions in a first database and (ii) the extracted data in a second database (block 310). The method 300 further includes applying the hybrid model by determining a response to one or more queries in the request based on the embedded one or more portions and the extracted data (block 312). The hybrid model may constrain each response based on at least one parametric input prompt associated with the extracted data. The method 300 further includes storing one or more data objects indicating each of the responses (block 314).

In certain embodiments, the hybrid model includes a large language model (LLM) and a symbolic artificial intelligence (S-AI) model. In these embodiments, the LLM is configured to embed the one or more portions into the vector space. Further in these embodiments, the S-AI model is configured to extract the data from the data file.

In some embodiments segmenting the data file includes extracting attributes from the data file, and segmenting the data file based on segmentation windows that each include one of the one or more portions. In these embodiments, storing the embedded one or more portions in the first database includes storing the attributes in the first database with the embedded one or more portions.

In certain embodiments, determining the response to each query in the request includes determining, by a question-answering LLM (QA-LLM), one or more sub-queries corresponding to each query based on a prompt-based instruction and a curated example, and sequentially answering each of the one or more sub-queries to determine the response to each query.

In some embodiments, determining the response to each query in the request includes determining an information extraction tool (IET) to search the first database and the second database; searching, by the IET, the first database to retrieve (i) the embedded one or more portions stored in the first database and (ii) the extracted data stored the second database; and structuring, by the IET, the response to each query based on the searching. In these embodiments, each IET utilizes an LLM trained to perform (i) the searching and (ii) the structuring. Further in these embodiments, each IET includes a corresponding description, and determining the IET includes determining a vector match similarity value between embeddings of each query and the corresponding description of each IET; and determining the IET for a respective query based on a respective IET with a highest vector match similarity value.

In certain embodiments, determining the response to each query in the request includes verifying, by a fusion LLM (F-LLM), the response from the IET based on a prompt-based weighting instruction. In these embodiments, the F-LLM is trained to resolve conflicts between the information indicated by (i) the embedded one or more portions stored in the first database and (ii) the extracted data stored the second database by utilizing few-shot prompting.

In some embodiments, storing the extracted data in the second database includes storing, for each data point of the extracted data, a phrase definition in the second database, wherein each phrase definition indicates a classification of the one or more classifications associated with the data point.

In certain embodiments, generating the data object includes structuring the data object to include (i) a binary output and (ii) supporting evidence from the first database and the second database for each response.

Of course, it is to be appreciated that the actions of the method 300 may be performed any suitable number of times, and that the actions described in reference to the method 300 may be performed in any suitable order.

EXAMPLES

The following list of examples reflects a variety of the embodiments explicitly contemplated by the present disclosure. Those of ordinary skill in the art will readily appreciate that the examples below are neither limiting of the embodiments disclosed herein, nor exhaustive of all of the embodiments conceivable from the disclosure above, but are instead meant to be exemplary in nature.

Example 1. A computer-implemented method comprising: receiving, by one or more processors, a data file and a request including at least one query associated with the data file; applying, by the one or more processors, a hybrid model to the data file, wherein applying the hybrid model includes segmenting the data file into one or more portions, embedding the one or more portions into a vector space, extracting, from the data file, data associated with one or more classifications, storing (i) the embedded one or more portions in a first database and (ii) the extracted data in a second database, and determining a response to one or more queries in the request based on the embedded one or more portions and the extracted data, wherein the hybrid model constrains each response based on at least one parametric input prompt associated with the extracted data; and storing, by the one or more processors, one or more data objects indicating each of the responses.

Example 2. The computer-implemented method of Example 1, wherein the hybrid model includes a large language model (LLM) and a symbolic artificial intelligence (S-AI) model.

Example 3. The computer-implemented method of Example 2, wherein the LLM is configured to embed the one or more portions into the vector space.

Example 4. The computer-implemented method of any of Examples 2 or 3, wherein the S-AI model is configured to extract the data from the data file.

Example 5. The computer-implemented method of any of Examples 1 through 4, wherein segmenting the data file comprises: extracting attributes from the data file; and segmenting the data file based on segmentation windows that each include one of the one or more portions.

Example 6. The computer-implemented method of Example 5, wherein storing the embedded one or more portions in the first database comprises: storing the attributes in the first database with the embedded one or more portions.

Example 7. The computer-implemented method of any of Examples 1 through 6, wherein determining the response to each query in the request comprises: determining, by a question-answering LLM (QA-LLM), one or more sub-queries corresponding to each query based on a prompt-based instruction and a curated example; and sequentially answering each of the one or more sub-queries to determine the response to each query.

Example 8. The computer-implemented method of any of Examples 1 through 7, wherein determining the response to each query in the request comprises: determining an information extraction tool (IET) to search the first database and the second database; searching, by the IET, the first database to retrieve (i) the embedded one or more portions stored in the first database and (ii) the extracted data stored the second database; and structuring, by the IET, the response to each query based on the searching.

Example 9. The computer-implemented method of Example 8, wherein each IET utilizes an LLM trained to perform (i) the searching and (ii) the structuring.

Example 10. The computer-implemented method of any of Examples 8 or 9, wherein each IET includes a corresponding description, and determining the IET comprises: determining a vector match similarity value between embeddings of each query and the corresponding description of each IET; and determining the IET for a respective query based on a respective IET with a highest vector match similarity value.

Example 11. The computer-implemented method of any of Examples 8 through 10, wherein determining the response to each query in the request comprises: verifying, by a fusion LLM (F-LLM), the response from the IET based on a prompt-based weighting instruction.

Example 12. The computer-implemented method of Example 11, wherein the F-LLM is trained to resolve conflicts between the information indicated by (i) the embedded one or more portions stored in the first database and (ii) the extracted data stored the second database by utilizing few-shot prompting.

Example 13. The computer-implemented method of any of Examples 1 through 12, wherein storing the extracted data in the second database comprises: storing, for each data point of the extracted data, a phrase definition in the second database, wherein each phrase definition indicates a classification of the one or more classifications associated with the data point.

Example 14. The computer-implemented method of any of Examples 1 through 13, wherein generating the data object comprises: structuring the data object to include (i) a binary output and (ii) supporting evidence from the first database and the second database for each response.

Example 15. A system comprising memory and one or more processors communicatively coupled to the memory, the one or more processors configured to: receive a data file and a request including at least one query associated with the data file; apply a hybrid model to the data file, wherein applying the hybrid model includes segmenting the data file into one or more portions, embedding the one or more portions into a vector space, extracting, from the data file, data associated with one or more classifications, storing (i) the embedded one or more portions in a first database and (ii) the extracted data in a second database, and determining a response to one or more queries in the request based on the embedded one or more portions and the extracted data, wherein the hybrid model constrains each response based on at least one parametric input prompt associated with the extracted data; and store one or more data objects indicating each of the responses.

Example 16. The system of Example 15, wherein the hybrid model includes a large language model (LLM) and a symbolic artificial intelligence (S-AI) model.

Example 17. The system of any of Examples 15 or 16, wherein determining the response to each query in the request comprises: determining, by a question-answering LLM (QA-LLM), one or more sub-queries corresponding to each query based on a prompt-based instruction and a curated example; and sequentially answering each of the one or more sub-queries to determine the response to each query.

Example 18. The system of any of Examples 15 through 17, wherein determining the response to each query in the request comprises: determining an information extraction tool (IET) to search the first database and the second database; searching, by the IET, the first database to retrieve (i) the embedded one or more portions stored in the first database and (ii) the extracted data stored the second database; and structuring, by the IET, the response to each query based on the searching.

Example 19. The system of Example 18, wherein each IET includes a corresponding description, and determining the IET comprises: determining a vector match similarity value between embeddings of each query and the corresponding description of each IET; and determining the IET for a respective query based on a respective IET with a highest vector match similarity value.

Example 20. One or more non-transitory computer-readable storage media including instructions that, when executed by one or more processors, cause the one or more processors to: receive a data file and a request including at least one query associated with the data file; apply a hybrid model to the data file, wherein applying the hybrid model includes segmenting the data file into one or more portions, embedding the one or more portions into a vector space, extracting, from the data file, data associated with one or more classifications, storing (i) the embedded one or more portions in a first database and (ii) the extracted data in a second database, and determining a response to one or more queries in the request based on the embedded one or more portions and the extracted data, wherein the hybrid model constrains each response based on at least one parametric input prompt associated with the extracted data; and store one or more data objects indicating each of the responses.

Example 21. The computer-implemented method of Example 1, wherein training the hybrid model is performed by the one or more processors.

Example 22. The computer-implemented method of Example 1, wherein: the one or more processors are included in a first computing entity; and training the hybrid model is performed by one or more processors included in a second computing entity.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method comprising:
   receiving, by one or more processors, a data file and a request including a query associated with the data file;
   applying, by the one or more processors, a hybrid model to the data file, wherein applying the hybrid model comprises:
   segmenting the data file into one or more portions,
   embedding the one or more portions into a vector space,
   extracting, from the data file, data associated with one or more classifications,
   storing (i) the embedded one or more portions in a first database and (ii) the extracted data in a second database,
   determining, based on the extracted data, a parametric input prompt configured to prevent the hybrid model from determining a response to the query that is unsupported by the extracted data, and
   determining the response to the query in the request based on the embedded one or more portions, the extracted data, and the parametric input prompt; and
   storing, by the one or more processors, a data object indicating the response.

2. The computer-implemented method of claim 1, wherein the hybrid model includes a large language model (LLM) and a symbolic artificial intelligence (S-AI) model.

3. The computer-implemented method of claim 2, wherein the LLM is configured to embed the one or more portions into the vector space.

4. The computer-implemented method of claim 2, wherein the S-AI model is configured to extract the data from the data file.

5. The computer-implemented method of claim 1, wherein segmenting the data file comprises:
   extracting one or more attributes from the data file; and
   segmenting the data file based on one or more segmentation windows that each include one of the one or more portions.

6. The computer-implemented method of claim 5, wherein storing the embedded one or more portions in the first database comprises:
   storing the one or more attributes in the first database with the embedded one or more portions.

7. The computer-implemented method of claim 1, wherein determining the response to the query in the request comprises:
   determining, by a question-answering LLM (QA-LLM), one or more sub-queries corresponding to the query based on a prompt-based instruction and a curated example; and
   sequentially answering each of the one or more sub-queries to determine the response to the query.

8. The computer-implemented method of claim 1, wherein determining the response to the query in the request comprises:
   determining a first information extraction tool (IET) of a plurality of IETs to search the first database and the second database;
   searching, by the first IET, the first database to retrieve (i) the embedded one or more portions stored in the first database and (ii) the extracted data stored in the second database; and
   structuring, by the first IET, the response to the query based on the searching.

9. The computer-implemented method of claim 8, wherein each IET of the plurality of IETs utilizes a large language model (LLM) trained to perform (i) the searching and (ii) the structuring.

10. The computer-implemented method of claim 8, wherein each IET of the plurality of IETs includes a corresponding description, and determining the first IET comprises:
    determining a vector match similarity value between embeddings of the query and the corresponding description of each IET; and
    determining the first IET for the query based on the first IET having a highest one of the vector match similarity value of each IET.

11. The computer-implemented method of claim 8, wherein determining the response to the query in the request comprises:
    verifying, by a fusion LLM (F-LLM), the response from the first IET based on a prompt-based weighting instruction.

12. The computer-implemented method of claim 11, wherein the F-LLM is trained to resolve conflicts between information indicated by (i) the embedded one or more portions stored in the first database and (ii) the extracted data stored in the second database by utilizing few-shot prompting.

13. The computer-implemented method of claim 1, wherein storing the extracted data in the second database comprises:
storing, for each data point of the extracted data, a phrase definition in the second database, wherein each phrase definition indicates a classification of the one or more classifications associated with the data point.

14. The computer-implemented method of claim 1, wherein generating the data object comprises:
structuring the data object to include (i) a binary output and (ii) supporting evidence from the first database and the second database for the response.

15. A system comprising:
one or more processors; and
at least one memory storing processor-executable instructions that, when executed by the one or more processors, cause the one or more processors to perform operations comprising:
receiving a data file and a request including a query associated with the data file;
applying a hybrid model to the data file, wherein applying the hybrid model comprises:
segmenting the data file into one or more portions,
embedding the one or more portions into a vector space,
extracting, from the data file, data associated with one or more classifications,
storing (i) the embedded one or more portions in a first database and (ii) the extracted data in a second database,
determining, based on the extracted data, a parametric input prompt configured to prevent the hybrid model from determining a response to the query that is unsupported by the extracted data, and
determining the response to the query in the request based on the embedded one or more portions, the extracted data, and the parametric input prompt; and
storing a data object indicating the response.

16. The system of claim 15, wherein the hybrid model includes a large language model (LLM) and a symbolic artificial intelligence (S-AI) model.

17. The system of claim 15, wherein determining the response to the query in the request comprises:
determining, by a question-answering LLM (QA-LLM), one or more sub-queries corresponding to the query based on a prompt-based instruction and a curated example; and
sequentially answering each of the one or more sub-queries to determine the response to the query.

18. The system of claim 15, wherein determining the response to the query in the request comprises:
determining a first information extraction tool (IET) of a plurality of IETs to search the first database and the second database;
searching, by the first IET, the first database to retrieve (i) the embedded one or more portions stored in the first database and (ii) the extracted data stored in the second database; and
structuring, by the first IET, the response to the query based on the searching.

19. The system of claim 18, wherein each IET includes a corresponding description, and determining the first IET comprises:
determining a vector match similarity value between embeddings of the query and the corresponding description of each IET; and
determining the first IET for the query based on the first IET having a highest one of the vector match similarity value of each IET.

20. One or more non-transitory computer-readable media storing processor-executable instructions that, when executed by one or more processors, cause the one or more processors to perform operations comprising:
receiving a data file and a request including a query associated with the data file;
applying a hybrid model to the data file, wherein applying the hybrid model comprises:
segmenting the data file into one or more portions,
embedding the one or more portions into a vector space,
extracting, from the data file, data associated with one or more classifications,
storing (i) the embedded one or more portions in a first database and (ii) the extracted data in a second database,
determining, based on the extracted data, a parametric input prompt configured to prevent the hybrid model from determining a response to the query that is unsupported by the extracted data, and
determining the response to the query in the request based on the embedded one or more portions, the extracted data, and the parametric input prompt; and
storing a data object indicating the response.

* * * * *